(12) United States Patent
Yoshimura et al.

(10) Patent No.: US 7,185,218 B2
(45) Date of Patent: Feb. 27, 2007

(54) SYNCHRONOUS CONTROLLING UNIT AND SYNCHRONOUS CONTROL METHOD

(75) Inventors: Katsuyoshi Yoshimura, Kawasaki (JP); Kazue Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 270 days.

(21) Appl. No.: 11/033,297

(22) Filed: Jan. 12, 2005

(65) Prior Publication Data

US 2005/0123086 A1 Jun. 9, 2005

Related U.S. Application Data

(63) Continuation of application No. PCT/JP02/10166, filed on Sep. 30, 2002.

(51) Int. Cl.
*G06F 1/00* (2006.01)
*G06F 1/04* (2006.01)

(52) U.S. Cl. .................. 713/500; 713/400; 713/600

(58) Field of Classification Search ............. None
See application file for complete search history.

(56) References Cited

U.S. PATENT DOCUMENTS 5,133,064 A 7/1992 Hotta et al.

6,498,617 B1* 12/2002 Ishida et al. ............ 347/252
6,748,039 B1* 6/2004 Bates ..................... 375/354
6,941,485 B2* 9/2005 Nomura et al. ......... 713/501

FOREIGN PATENT DOCUMENTS

| JP | 6-131074 | 5/1994 |
|---|---|---|
| JP | 10-16769 | 1/1998 |
| JP | 2002-14742 | 1/2002 |

* cited by examiner

*Primary Examiner*—James K. Trujillo
*Assistant Examiner*—Stefan Stoynov
(74) *Attorney, Agent, or Firm*—Staas & Halsey LLP

(57) ABSTRACT

An information processing system is operated by reference clock signals supplied to a plurality of units. High frequency clock signals are generated from the reference clock signals supplied. Shift-holding of the reference clock signals is performed based on the high frequency clock signals, and shift-hold data is stored. The reference clock signals and the high frequency clock signals are synchronized based on the shift-hold data, and synchronization information is stored. Data communication is carried out between the first unit and other units, based on the synchronization information.

6 Claims, 8 Drawing Sheets

FIG.6

| | | | | | | | | | | | | | | |
|---|---|---|---|---|---|---|---|---|---|---|---|---|---|---|
| clock-y | | | | | | | | | | | | | | |
| pll-ff-clock | | | | | | | | | | | | | | |
| COUNTER 420 | | 0 | 1 | 0 | 1 | 0 | 1 | 0 | 1 | | | | | |
| COUNTER 340 | 00 | 01 | 10 | 11 | 00 | 01 | 10 | 11 | 00 | 01 | 10 | 11 | 00 | 01 | 10 | 11 |
| FF CIRCUIT 26 | | | B | | A | | B | | A | | B | | A | | B | |
| FF CIRCUIT 32 | | | | B | B | A | A | B | B | A | A | B | B | A | A | |
| FF CIRCUIT 36 | | | | | | | | | | A | A | | | A | A | |
| FF CIRCUIT 37 | | | | | B' | B' | | | B' | B' | | | | | B' | B' |

SYNCHRONOUS CONTROLLING UNIT AND SYNCHRONOUS CONTROL METHOD

This application is a continuing application, filed under 35 U.S.C. §111(a), of International Application PCT/JP02/10166, filed Sep. 30, 2002.

BACKGROUND OF THE INVENTION

1) Field of the Invention

The present invention relates to a synchronous controlling unit and a synchronous control method that performs clock synchronization to thereby allow serial transmission between units that are operated at different frequencies.

2) Description of the Related Art

FIG. 7 is a structural block diagram of a conventional information processing system. The information processing system shown in FIG. 7 includes a clock controlling unit 10, a unit 20, and a unit 30. The clock controlling unit 10 generates clock signals CL at predetermined timing as shown in FIG. 8, and supplies the clock signals CL to the unit 20 and the unit 30.

The unit 20 is, for example, a main storage, and is operated by the clock signals CL from the clock controlling unit 10. On the other hand, the unit 30 is, for example, a CPU, and is operated by the same clock signals CL.

In this way, in the information processing system shown in FIG. 7, the unit 20 and the unit 30 are operated by the clock signals CL at the same frequency, bringing about a synchronous state. With the use of this synchronization, serial transmission of signals and data is carried out between the unit 20 and the unit 30.

The unit 20 includes a one-bit counter 21. As shown in FIG. 8, the counter 21 counts one bit every time the clock signals CL in one cycle are input, and outputs 0 and 1 alternately.

An AND circuit 22 implements the AND of an output from the counter 21 and a signal A. An AND circuit 23 implements the AND of an inverted output of the output from the counter 21 inverted by a NOT circuit 24 and a signal B. The signals A and B are signals that are serially transmitted between the units 20 and 30.

An OR circuit 25 implements the OR of an output from the AND circuit 22 and an output from the AND circuit 23. A flip-flop (FF) circuit 26 is controlled by the clock signals CL from the clock controlling unit 10, and stores outputs from the OR circuit 25. The FF circuit 26 is used for serial transmission to an FF circuit 32 of the unit 30. The signals B and the signals A are alternately output from the FF circuit 26 in synchronization with the clock signals CL as shown in FIG. 8.

On the other hand, the unit 30 includes a one-bit counter 31, counts one bit every time clock signals CL in one cycle are input in a synchronous state with the counter 21, and outputs 0 and 1 alternately as shown in FIG. 8.

The FF circuit 32 is provided corresponding to the FF circuit 26 of the unit 20, is controlled by the clock signals CL from the clock controlling unit 10, and stores outputs from the FF circuit 26. The signals B and the signals A are alternately output from the FF circuit 32 in synchronization with the clock signals CL as shown in FIG. 8.

An AND circuit 33 implements the AND of an output from the counter 31 and an output from the FF circuit 32 (the signal A or the signal B). An AND circuit 34 implements the AND of an inverted output of the output from the counter 31 inverted by a NOT circuit 35 and an output from the FF circuit 32 (the signal A or the signal B).

An FF circuit 36 is controlled by the clock signals CL from the clock controlling unit 10, and stores outputs from the AND circuit 33. Signals A' are output from the FF circuit 36, as shown in FIG. 8. An FF circuit 37 is controlled by the same clock signals CL, and stores outputs from the AND circuit 34. Signals B' are output from the FF circuit 37, as shown in FIG. 8.

As described above, in the conventional information processing system, serial transmission is performed provided that the unit 20 and the unit 30 shown in FIG. 7 are synchronized with each other by the clock signals CL at the same frequency.

However, if the unit 20 and the unit 30 utilize clock signals at a frequency different from each other, carrying out serial transmission becomes difficult.

SUMMARY OF THE INVENTION

It is an object of the present invention to at least solve the problems in the conventional technology.

A synchronous controlling unit according to an aspect of the present invention is applied to an information processing system that is operated by reference clock signals supplied to a plurality of units. The synchronous controlling unit includes a generating unit that generates high frequency clock signals from the reference clock signals supplied to a first unit among the plurality of the units; a shift-holding unit that performs shift holding of the reference clock signals based on the high frequency clock signals, and that stores shift-hold data; a synchronizing unit that synchronizes the reference clock signals and the high frequency clock signals based on the shift-hold data, and that stores synchronization information; and a communicating unit that carries out data communication between the first unit and other units among the plurality of the units, based on the synchronization information.

A synchronous control method according to another aspect of the present invention is applied to an information processing system that is operated by reference clock signals supplied to a plurality of units. The synchronous control method includes generating high frequency clock signals from the reference clock signals supplied to a first unit among the plurality of the units; shift-holding the reference clock signals based on the high frequency clock signals, thereby storing shift-hold data; synchronizing the reference clock signals and the high frequency clock signals based on the shift-hold data, thereby storing synchronization information; and carrying out data communication between the first unit and other units among the plurality of the units, based on the synchronization information.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is a timing chart to explain serial transmission;

DETAILED DESCRIPTION

Exemplary embodiments of a synchronous controlling unit and a synchronous control method according to the present invention are explained in detail below, referring to the accompanying drawings.

Figure 1:
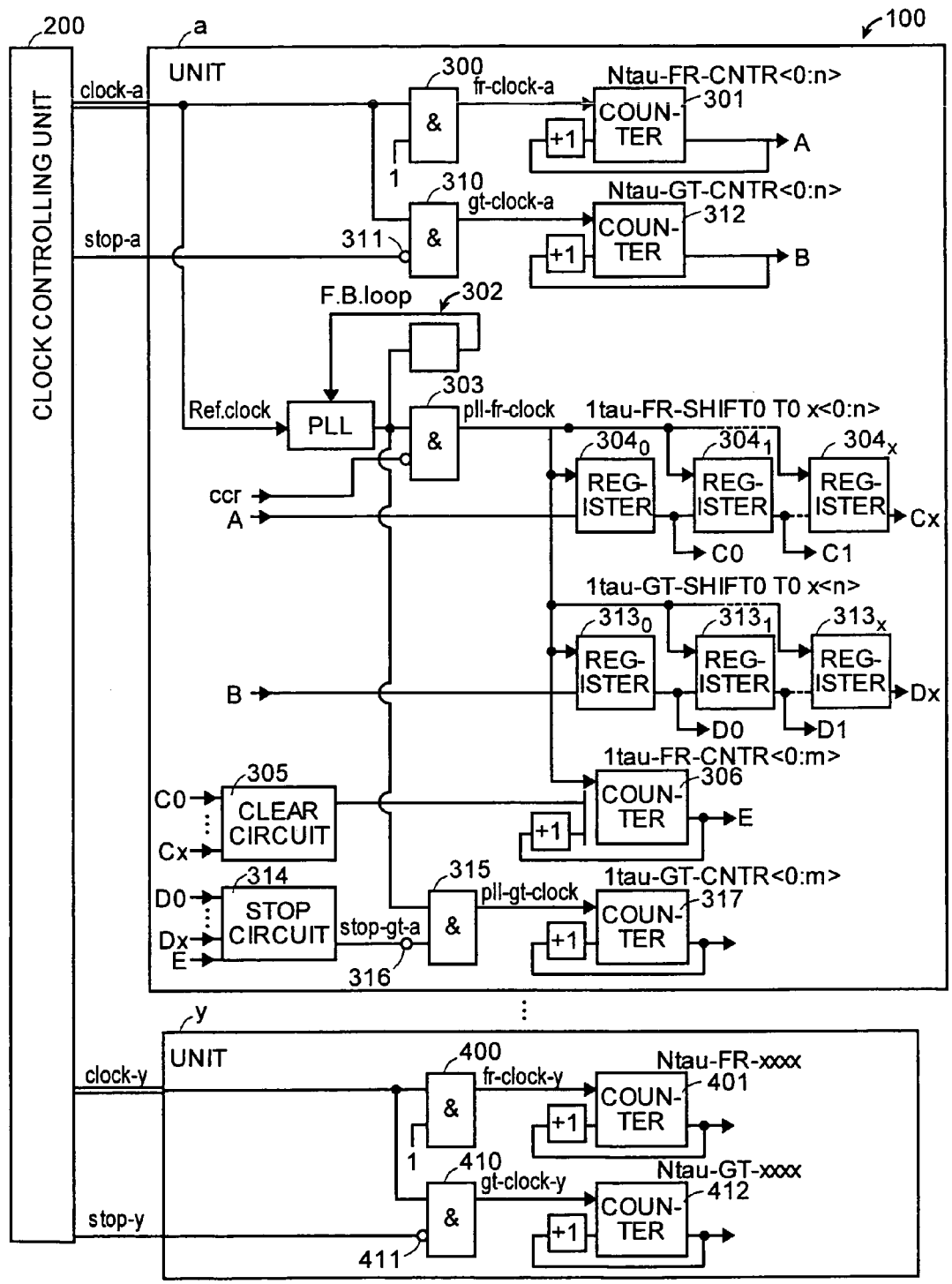
FIG. 1 is a structural block diagram of an information processing system according to an embodiment of the present invention.

FIG. 1 is a structural block diagram of an information processing system according to an embodiment of the present invention. As shown in FIG. 1, an information processing system 100 includes a clock controlling unit 200, and a plurality of units, unit a to unit y.

The clock controlling unit 200 generates reference clock signals clock-a to clock-y at predetermined timing, and supplies these signals to the units a to y, respectively. Each of the reference clock signals clock-a to clock-y has the same frequency. The reference clock signals clock-a are supplied to the unit a. The other reference clock signals are supplied in a similar manner, and thus the reference clock signals clock-y are supplied to the unit y.

Further, the clock controlling unit 200 generates stop signals stop-a to stop-y (see FIG. 3) to carry out stop control of the clock signals, and supplies them to the units a to y, respectively. The stop signals stop-a are supplied to the unit a. The other stop signals are input in a similar manner, and thus the stop signals stop-y are supplied to the unit y.

The unit a may be a CPU, multiplies the frequency of the reference clock signals clock-a supplied from the clock controlling unit 200 by N, and is operated based on the clock signals pll-fr-clock that has frequency N times the reference clock signals clock-a.

On the other hand, the unit y may be a main storage, and is operated by the reference clock signals clock-y supplied from the clock controlling unit 200. In this way, the unit a and the unit y in the information processing system 100 are operated by clock signals at frequencies different from each other. Therefore, the unit a and the unit y are not synchronized with each other in such a situation, which makes it impossible to carry out serial transmission.

Accordingly, a synchronizing unit to synchronize between the unit a and the unit y is provided in the unit a of the embodiment, which makes serial transmission possible in a circumstance that clock signals have different frequencies.

Figure 2:
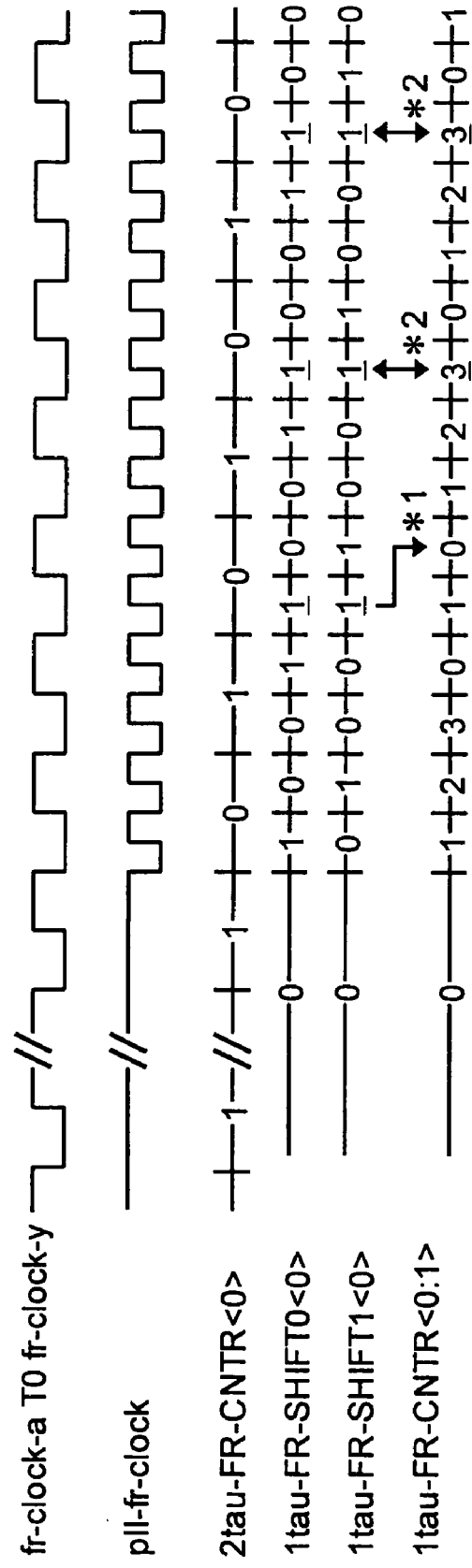
FIG. 2 is a timing chart to explain a first synchronous operation.
Figure 3:
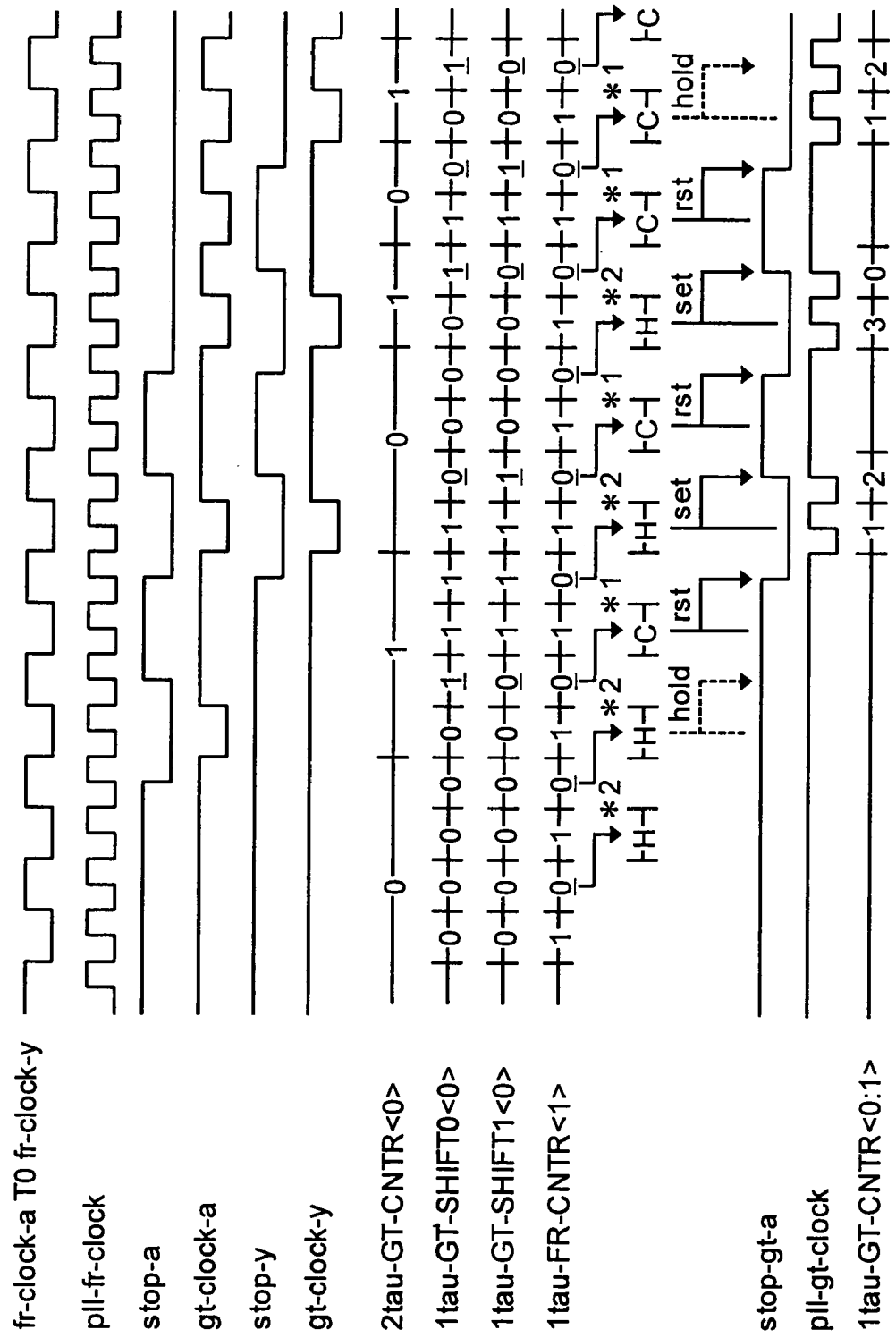
FIG. 3 is a timing chart to explain a second synchronous operation.

In the unit a, an AND circuit 300 implements the AND of the reference clock signal clock-a supplied from the clock controlling unit 200 and a default signal "1", and generates clock signals fr-clock-a (see FIGS. 2 and 3).

A counter 301 counts clock signals every time the clock signals fr-clock-a in one cycle are input, and outputs Ntau-FR-CNTR<0> (2tau-FR-CNTR<0> in FIG. 2). A frequency multiplying circuit 302 multiplies the frequency of the reference clock signals clock-a by N (hereinafter, two-fold multiplication).

An AND circuit 303 implements the AND of an output from the frequency multiplying circuit 302 and an inverted output of the output from a clock control register (ccr) inverted by a NOT circuit 304, and outputs the clock signals pll-fr-clock (see FIGS. 2 and 3).

Registers $304_0$ to $304_x$ constitute shift registers with x stages, are synchronously operated with the clock signals pll-fr-clock as shown in FIG. 2, and perform shift holding of the outputs (2tau-FR-CNTR<0>) from the counter 301.

A clear circuit 305 clears a counter 306 under a certain condition (explained later). The counter 306 counts clock signals pll-fr-clock. An AND circuit 310 implements the AND of a reference clock signal clock-a from the clock controlling unit 200 and an inverted stop signal of the stop signal stop-a inverted by a NOT circuit 311, and generates clock signals gt-clock-a (see FIG. 3).

A counter 312 counts clock signals every time clock signals gt-clock-a in one cycle are input, and outputs Ntau-GT-CNTR<0> (2tau-GT-CNTR<0> in FIG. 3).

Registers $313_0$ to $313_x$ constitute shift registers with x stages, are synchronously operated with the clock signals pll-fr-clock shown in FIG. 3, and perform shift holding of the outputs (2tau-GT-CNTR<0>) from the counter 312.

A stop circuit 314 is used when the clock signals pll-gt-clock used in the unit a are synchronized with the clock signals gt-clock-y used in the unit y.

An AND circuit 315 implements the AND of an inverted stop signal stop-gt-a (see FIG. 3) output by the stop circuit 314 inverted by a NOT circuit 316 and an output from the frequency multiplying circuit 302, and outputs the clock signals pll-gt-clock (see FIG. 3). A counter 317 counts the clock signals pll-gt-clock. The result from the counting is set to 1tau-GT-CNTR<0:m> (1tau-GT-CNTR<0:1> in FIG. 3).

In the unit y, an AND circuit 400 implements the AND of a reference clock signal clock-y and a default signal "1", and generates clock signals fr-clock-y (see FIGS. 2 and 3).

A counter 401 counts clock signals every time clock signals fr-clock-y in one cycle are input, and outputs Ntau-FR-xxxx.

An AND circuit 410 implements the AND of a reference clock signal clock-y from the clock controlling unit 200 and an inverted stop signal stop-y inverted by a NOT circuit 411, and generates clock signals gt-clock-y. A counter 412 counts clock signals every time the clock signals gt-clock-y in one cycle are input, and outputs Ntau-GT-xxxx.

Next, a first synchronous operation in the embodiment is explained with reference to FIG. 2. The first synchronous operation is an operation to synchronize the clock signals pll-fr-clock used in the unit a shown in FIG. 1 with the clock signals fr-clock-y used in the unit y (the reference clock signals clock-y).

As shown in FIG. 2, the clock signals pll-fr-clock are produced by two-fold multiplication of the reference clock signals clock-a. In this state, the outputs 2tau-FR-CNTR<0> from the counter 301 are synchronized with the clock signals pll-fr-clock, and are shift-held in the registers $304_0$ and $304_1$ (two registers are used due to two-fold multiplication).

As shown in FIG. 2, the data held in the register $304_0$ is 1tau-FR-SHIFT0<0>. The data held in the register $304_1$ is 1tau-FR-SHIFT1<0>. These data held are input to the clear circuit 305 as C0 and C1, respectively.

When the condition that the 1tau-FR-SHIFT0 (C0) is 1, and the 1tau-FR-SHIFT1 (C1) is also 1 is met, the clear circuit 305 clears the counter 306 to set 1tau-FR-CNTR<0:1> to 0 as indicated by "*1" in FIG. 2. This timing becomes the starting point of synchronization.

Thereafter, when the condition that the 1tau-FR-SHIFT0 (C0) is 1 and the 1tau-FR-SHIFT1 (C1) is also 1 is met, synchronous signals E (see FIG. 1) are checked as indicated by "*2" in FIG. 2. These synchronous signals E represent a timing at which the 1tau-FR-CNTR<0:1>becomes 3, and synchronize with the clock signals fr-clock-y.

Thus, the clock signals pll-fr-clock used in the unit a and the clock signals fr-clock-y used in the unit y are synchronized with each other, which makes serial transmission possible between the units a and y.

Next, a second synchronous operation in the embodiment is explained with reference to FIG. 3. The second synchronous operation synchronizes the clock signals pll-gt-clock used in the unit a shown in FIG. 1 with the clock signals gt-clock-y used in the unit y (stop signals stop-y).

As shown in FIG. 3, the clock signals pll-gt-clock are produced by two-fold multiplication of the clock signals gt-clock-a. In this state, when stop signals stop-a having the gate width shown in FIG. 3 are input from the clock controlling unit 200 to the AND circuit 310 through the NOT circuit 311 of the unit a, the clock signals gt-clock-a shown in FIG. 3 are output from the AND circuit 310. These clock signals gt-clock-a correspond to the clock signals fr-clock-a (clock-a) contained in the gate width of the stop signals stop-a.

Further, when stop signals stop-y having the gate width shown in FIG. 3 are input from the clock controlling unit 200 to the AND circuit 410 through the NOT circuit 411 of the unit y, the clock signals gt-clock-y shown in FIG. 3 are output from the AND circuit 410.

Then, in the unit a, outputs 2tau-GT-CNTR<0> from the counter 312 are synchronized with the clock signals pll-fr-clock, and are shift-held in the registers $313_0$ and $313_1$ (two registers are used due to two-fold multiplication).

As shown in FIG. 3, the data held in the register $313_0$ is 1tau-GT-SHIFT0. In addition, the data held in the register $313_1$ is 1tau-GT-SHIFT1. These data held are input to the stop circuit 314 as D0 and D1, respectively. The synchronous signals E (1tau-FR-CNTR<1>) from the counter 306 is also input into the stop circuit 314.

The stop circuit 314 monitors points differing between the 1tau-GT-SHIFT0 and the 1tau-GT-SHIFT1 at the timing when the synchronous signal E is input, that is, when the 1tau-FR-CNTR<1> is 0, as shown in FIG. 3.

In other words, when the condition that the 1tau-GT-SHIFT0 (D0) is 0 (or 1) and the 1tau-GT-SHIFT1 (D1) is 1 (or 0), that is, when the 1tau-GT-SHIFT0 (D0) ≠ the 1tau-GT-SHIFT1 (D1) is met, the stop circuit 314 recognizes C (change) as indicated by "*1" in FIG. 3.

Here, upon recognizing C (change), the stop circuit 314 resets the stop signal stop-gt-a (from 1 to 0) if the stop signal stop-gt-a is 1.

Furthermore, when the condition that the 1tau-GT-SHIFT0 (D0) is 0 (or 1) and the 1tau-GT-SHIFT1 (D1) is 0 (or 1), that is, when the 1tau-GT-SHIFT0 (D0)=the 1tau-GT-SHIFT1 (D1) is met, the stop circuit 314 recognizes H (hold) as indicated by "*2" in FIG. 3.

Here, upon recognizing H (hold), the stop circuit 314 sets the stop signal stop-gt-a (from 0 to 1) if the stop signal stop-gt-a is 0.

The clock signals pll-gt-clock shown in FIG. 3 are output from the AND circuit 315. The clock signals pll-gt-clock are synchronized with the clock signals gt-clock-y used in the unit y. In addition, 1tau-GT-CNTR<0:1> shown in FIG. 3 is output from the counter 317.

Figure 4A:
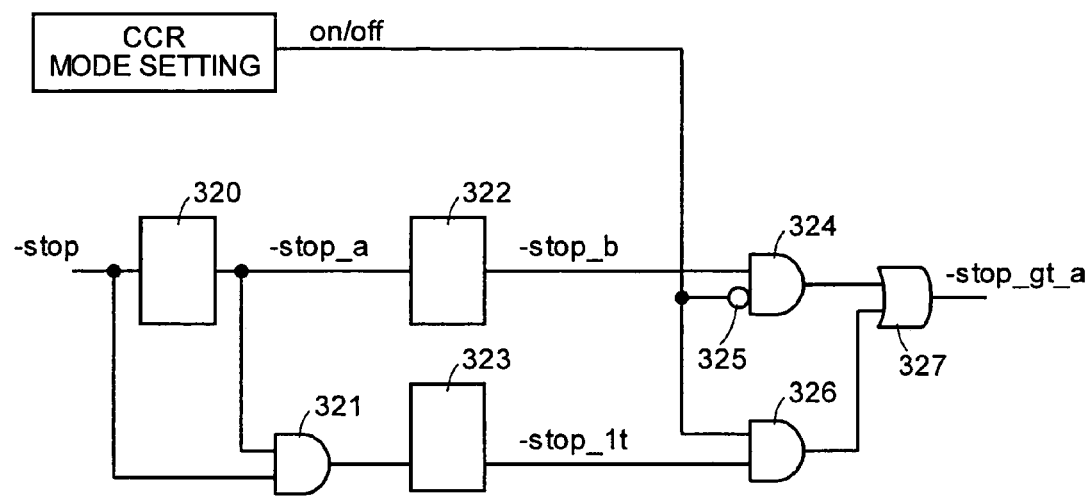
FIG. 4A is a structural diagram of a clock unit-control circuit in the stop circuit 314 shown in FIG. 1.
Figure 4B:
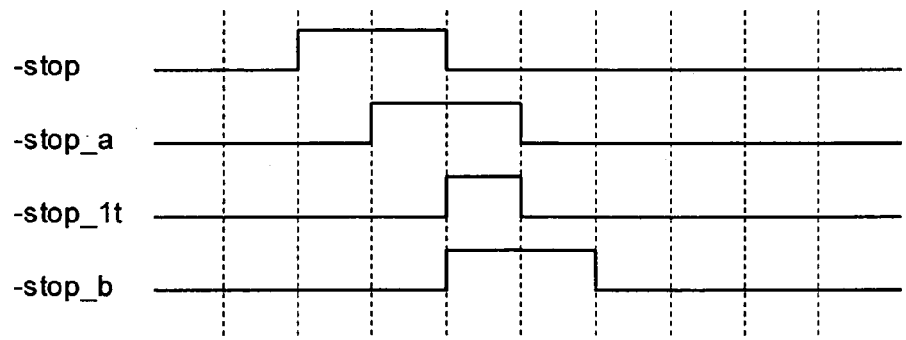
FIG. 4B is an explanatory diagram of an operation of the clock unit-control circuit.

FIG. 4A is a structural diagram of a clock unit-control circuit in the stop circuit 314 shown in FIG. 1. The clock unit-control circuit shown in FIG. 4A carries out the operation shown in FIG. 4B, and includes a latch circuit 320, an AND circuit 321, a latch circuit 322, a latch circuit 323, an AND circuit 324, a NOT circuit 325, an AND circuit 326, and an OR circuit 327.

An example in which the unit a and the unit y are synchronized with each other by the first synchronous operation (see FIG. 2) and the second synchronous operation (see FIG. 3) has been explained above; however, it is needless to say that this synchronization can be utilized for serial transmission.

Figure 5:
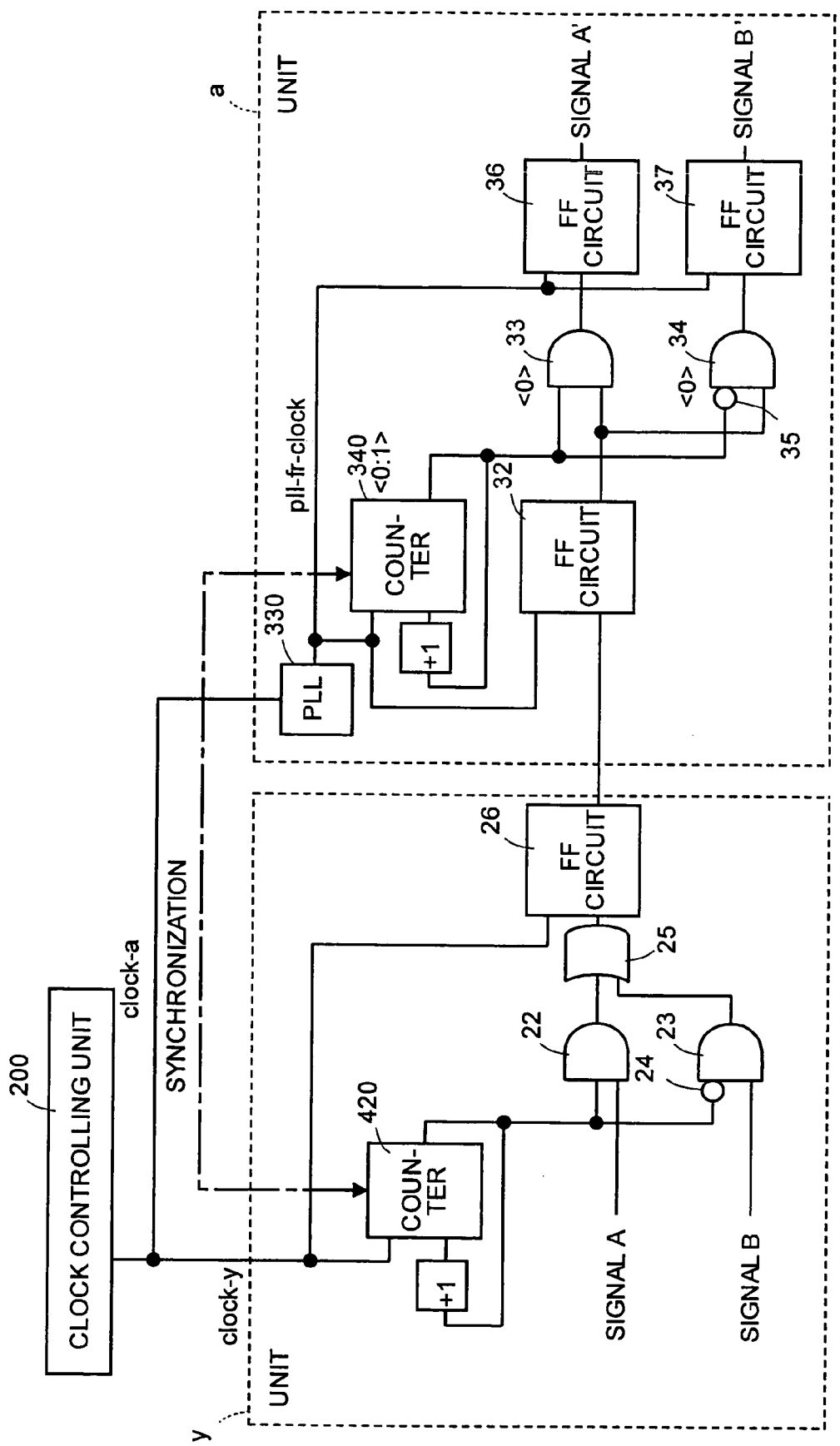
FIG. 5 is a block diagram to explain serial transmission.
Figure 7:
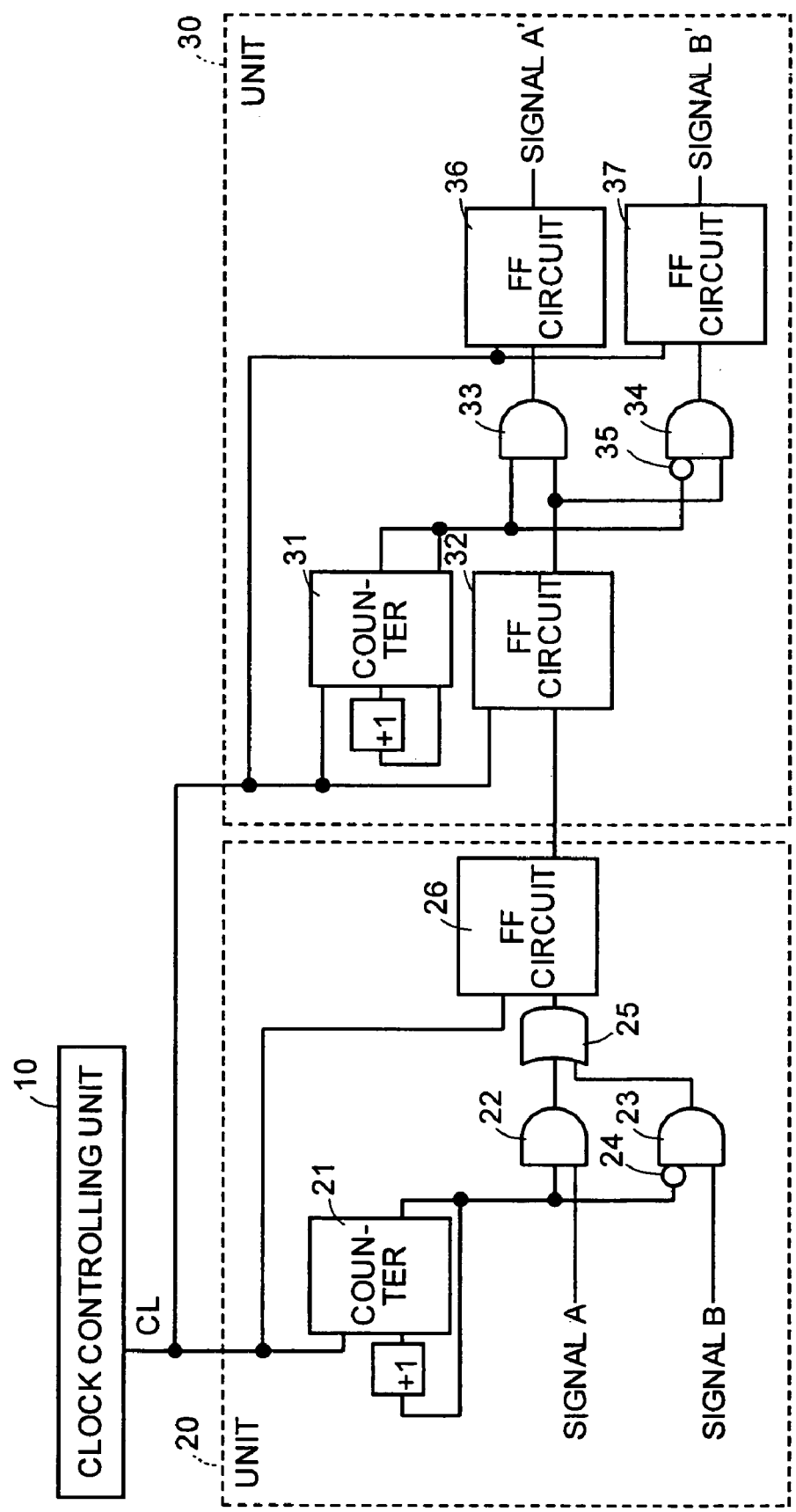
FIG. 7 is a structural block diagram of a conventional information processing system.
Figure 8:
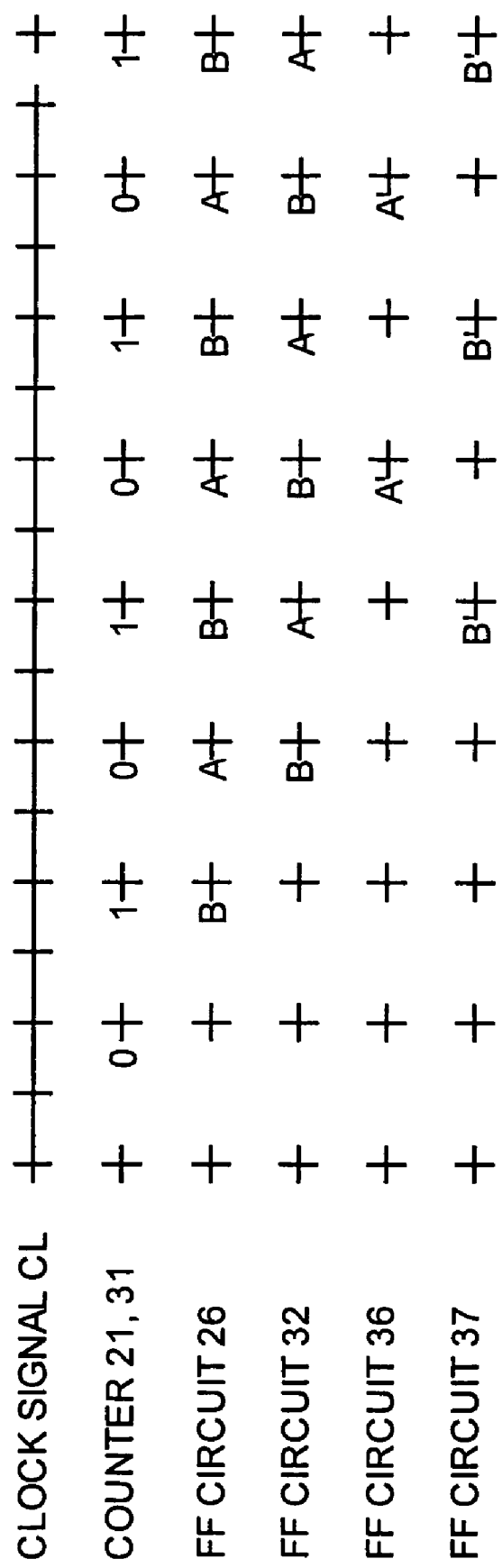
FIG. 8 is a timing chart to explain an operation of the conventional information processing system.

To carry out serial transmission between the unit a and the unit y shown in FIG. 1, the structure shown in FIG. 5 may be provided in the unit a and the unit y. In FIG. 5, the same components corresponding to those in FIGS. 1 and 7 are designated by the same reference numerals.

The unit y shown in FIG. 5 is operated by the reference clock signals clock-y supplied from the clock controlling unit 200, as described above. On the other hand, the unit a is operated by the clock signals pll-fr-clock that are produced by a frequency multiplying circuit 330, by multiplication of the reference clock signals clock-a by N. The frequency multiplying circuit 330 corresponds to the frequency multiplying circuit 302 of FIG. 1.

In the unit y of FIG. 5, a counter 420 counts the reference clock signals clock-y as shown in FIG. 6, and corresponds to the counter 401 shown in FIG. 1. In the unit a, a counter 340 counts the clock signals pll-fr-clock as shown in FIG. 6, and corresponds to the counter 306 in FIG. 1. The counter 420 and the counter 340 are synchronized with each other by the first synchronous operation described above.

The FF circuit 26 is controlled by the reference clock signals clock-y, and stores outputs from the OR circuit 25. The FF circuit 26 is used for serial transmission to the FF circuit 32 of the unit a. The FF circuit 26 outputs the signals B and A alternately, as shown in FIG. 6.

On the other hand, in the unit a, the FF circuit 32 is provided corresponding to the FF circuit 26 of the unit y, and stores outputs from the FF circuit 26. The FF circuit 32 outputs the signal B, the signals B and A, and the signal A sequentially, as shown in FIG. 6.

The FF circuit 36 outputs the signals A', and the FF circuit 37 outputs the signals B', as shown in FIG. 6.

As explained above, according to the embodiment, the unit a is operated based on the clock signals pll-fr-clock that are produced by multiplication of the frequency of the reference clock signals clock-a. The reference clock signals clock-y used in the unit y and the clock signals pll-fr-clock are synchronized with each other based on the held contents of the shift registers (registers $304_0$ to $304_x$) corresponding to the reference clock signals clock-a, and serial transmission is carried out between the unit a and the unit y based on the synchronization information. Therefore, even if the frequencies of the clock signals are different, data communication between the units can be carried out easily.

Furthermore, synchronization of a timing to stop the clock signals pll-fr-clock in the unit a with a timing to stop the reference clock signals clock-y in the unit y is carried out based on the stop signals stop-a to stop-y supplied from the clock controlling unit 200. Therefore, even if frequencies of the clock signals are different, it is possible to set the stop timing between the units.

Moreover, synchronization is carried out according to the resolution of the clock signals pll-fr-clock. Therefore, it is possible to carry out more precise synchronous control.

The embodiment according to the present invention has been explained in detail with reference to the drawings. However, specific structural examples are not limited to this embodiment. Modifications and alternatives made without departing from the scope of the present invention are included in the present invention.

As described above, according to the present invention, even if the frequencies of the clock signals are different, data communication can be carried out among the units easily.

Furthermore, even if the clock signals have different frequencies, the timing to stop can be set among the units.

Moreover, more precise synchronous control can be carried out.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A synchronous controlling unit applied to an information processing system that is operated by reference clock signals supplied to a plurality of units, the synchronous controlling unit comprising:
   a generating unit that generates high frequency clock signals from the reference clock signals supplied to a first unit among the plurality of the units;
   a shift-holding unit that performs shift holding of the reference clock signals based on the high frequency clock signals, and that stores shift-hold data;
   a synchronizing unit that synchronizes the reference clock signals and the high frequency clock signals based on the shift-hold data, and that stores synchronization information; and
   a communicating unit that carries out data communication between the first unit and other units among the plurality of the units, based on the synchronization information.

2. The synchronous controlling unit according to claim 1, wherein
   the synchronizing unit synchronizes a timing to stop the high frequency clock signals in the first unit with a timing to stop the reference clock signals in the other units, based on stop information supplied externally.

3. The synchronous controlling unit according to claim 2, wherein the synchronizing unit carries out synchronization based on a resolution of the high frequency clock signals.

4. A synchronous control method applied to an information processing system that is operated by reference clock signals supplied to a plurality of units, the synchronous control method comprising:
   generating high frequency clock signals from the reference clock signals supplied to a first unit among the plurality of the units;
   shift-holding the reference clock signals based on the high frequency clock signals, thereby storing shift-hold data;
   synchronizing the reference clock signals and the high frequency clock signals based on the shift-hold data, thereby storing synchronization information; and
   carrying out data communication between the first unit and other units among the plurality of the units, based on the synchronization information.

5. The synchronous control method according to claim 4, wherein
   at the synchronizing, a timing to stop the high frequency clock signals in the first unit is synchronized with a timing to stop the reference clock signals in the other units, based on stop information supplied externally.

6. The synchronous control method according to claim 5, wherein the synchronizing is carried out based on a resolution of the high frequency clock signals.

* * * * *